(12) United States Patent
Krishnamurthi et al.

(10) Patent No.: US 7,894,824 B2
(45) Date of Patent: Feb. 22, 2011

(54) APPARATUS, AND ASSOCIATED METHOD, FOR PROVIDING LOCATION SERVICE TO A ROAMING MOBILE STATION

(75) Inventors: Govindarajan Krishnamurthi, San Diego, CA (US); Sreenivas Addagatla, San Diego, CA (US)

(73) Assignee: Nokia Corporation, Espoo (FI)

( * ) Notice: Subject to any disclaimer, the term of this patent is extended or adjusted under 35 U.S.C. 154(b) by 528 days.

(21) Appl. No.: 11/195,503

(22) Filed: Aug. 2, 2005

(65) Prior Publication Data

US 2006/0025130 A1 Feb. 2, 2006

Related U.S. Application Data

(60) Provisional application No. 60/598,141, filed on Aug. 2, 2004, provisional application No. 60/598,647, filed on Aug. 4, 2004.

(51) Int. Cl.
*H04W 24/00* (2009.01)
(52) U.S. Cl. ............... 455/456.1; 455/432.1; 455/404.2
(58) Field of Classification Search ............. 455/404.1, 455/432.1, 433, 435.1, 439, 440, 456.1–457, 455/466, 404.2, 412.1, 414.1, 414.2, 418–420, 455/436, 550.1, 552.1, 556.2, 558; 370/328, 370/331, 338, 401
See application file for complete search history.

(56) References Cited

U.S. PATENT DOCUMENTS

| | | | |
|---|---|---|---|
| 5,819,178 A | 10/1998 | Cropper | |
| 6,002,932 A * | 12/1999 | Kingdon et al. | 455/433 |
| 6,308,267 B1 | 10/2001 | Gremmelmaier | |
| 6,563,811 B2 * | 5/2003 | Hansen et al. | 370/338 |
| 6,741,848 B2 * | 5/2004 | Timonen et al. | 455/405 |
| 6,745,029 B2 * | 6/2004 | Lahtinen et al. | 455/432.1 |
| 6,901,258 B2 * | 5/2005 | Rajkotia | 455/445 |
| 6,992,995 B2 * | 1/2006 | Agrawal et al. | 370/328 |
| 7,106,710 B1 * | 9/2006 | Smith | 370/331 |
| 7,218,940 B2 * | 5/2007 | Niemenmaa et al. | 455/456.1 |
| 7,245,910 B2 * | 7/2007 | Osmo | 455/432.1 |
| 7,277,711 B2 * | 10/2007 | Nyu | 455/456.1 |
| 7,308,237 B2 * | 12/2007 | Kokkonen et al. | 455/185.1 |
| 2001/0003093 A1 * | 6/2001 | Lundin | 455/456 |
| 2002/0049065 A1 * | 4/2002 | Wallenius | 455/461 |
| 2003/0228868 A1 | 12/2003 | Turanyi | |
| 2004/0242238 A1 * | 12/2004 | Wang et al. | 455/456.1 |
| 2005/0086541 A1 * | 4/2005 | Rajaniemi | 713/202 |
| 2005/0125493 A1 * | 6/2005 | Chaskar et al. | 709/203 |
| 2006/0002356 A1 * | 1/2006 | Barany et al. | 370/338 |
| 2006/0058042 A1 * | 3/2006 | Shim | 455/456.3 |
| 2006/0099958 A1 * | 5/2006 | Gustafsson et al. | 455/456.1 |
| 2006/0194594 A1 * | 8/2006 | Ruutu et al. | 455/456.5 |

FOREIGN PATENT DOCUMENTS

WO    WO 03056781 A1 *  7/2003

* cited by examiner

*Primary Examiner*—Anthony S. Addy
(74) *Attorney, Agent, or Firm*—Alston & Bird LLP

(57) ABSTRACT

Apparatus, and an associated method, for facilitating performance of location services for a mobile station that roams beyond its home network. A cache is provided at the mobile station. The cache is populated with a value identifying the address of the serving position server. When a location service is requested, the cache is accessed, and a message is sent to the address identified in the cache. The cache is updatable, such as through the generation and forwarding of a message to the mobile station by the home position server responsive to registration of the mobile station.

21 Claims, 3 Drawing Sheets

APPARATUS, AND ASSOCIATED METHOD, FOR PROVIDING LOCATION SERVICE TO A ROAMING MOBILE STATION

CROSS-REFERENCE TO RELATED APPLICATIONS

The present invention claims the priority of U.S. Provisional Patent Application Ser. No. 60/598,141, filed on Aug. 2, 2004, and Ser. No. 60/598,647, filed on Aug. 4, 2004, the contents of which are incorporated herein by reference.

The present invention relates generally to a manner by which to perform a location service in which the position of a mobile station is identified. More particularly, the present invention relates to apparatus, and an associated method, by which to provide a mobile station with position identification information when the mobile station is positioned away from its home network, in a serving network.

The mobile station is provided with the address of a serving network position server, and the mobile station communicates directly with the serving network position server without need to access a home position server when the mobile station requests position identification information pursuant to a location service.

BACKGROUND OF THE INVENTION

The use of wireless communication systems through which to communicate is widespread. In a wireless communication system, a radio link is utilized upon which to form a communication path between a set of communication stations formed of at least a sending station and a receiving station. In contrast to a conventional, wireline communication system that requires fixed, wired connections to be maintained between the sending and receiving stations that are parties to a communication session, communications are possible through use of a wireless communication system even when the communication stations are positioned at locations that are not permitting of wired connections. A mobile communication system is also implementable as a mobile communication system in which one or more of the communication stations parties to a communication session are permitted mobility.

Various types of wireless communication systems have been developed and deployed, utilized by many to effectuate many different types of communication services. A cellular communication system is exemplary of a wireless radio communication system. Successive generations of cellular communication systems have been developed and deployed, taking advantage of technological advancements in communication technologies as they become available.

So-called, first generation cellular communication systems generally utilized analog communication techniques and provided for only limited data communication services. Successor-generation cellular communication systems make use of digital communication techniques and provide for increasingly data-intensive communication services.

Increasingly, data that is communicated pursuant to effectuation of a communication service is communicated in the form of data packets that are communicated at discrete intervals. Communication of data in packet form permits bandwidth allocated to a communication system to be efficiently utilized.

Standardized packet formatting schemes are generally utilized in packet communications. An Internet protocol (IP) packet formatting scheme is exemplary of a formatting scheme that has achieved high levels of usage. And, generally, Internet protocol-based signaling, and applications and technologies utilizing such signaling, is of significant interest in evolving cellular communication technologies. The Open Mobile Alliance (OMA) and the Third Generation Partnership Project 2 (3GPP2) technology forums are presently considering standardized procedures with respect to various IP-based services. Of particular interest here are specifications related to IP-based location services for wireless communications.

Currently-proposed and existing procedures related to IP-based location services require that a mobile station always first directly signal a home position server in its home network pursuant to a location service. Signaling to the home network of the mobile station provides for administrative control over procedures, particularly with respect to authentication, authorization, and accounting (AAA) procedures. The need to signal the home network when the mobile station is roaming beyond its home network into a serving network is otherwise quite inefficient, particularly when the mobile station roams significant distances beyond its home network. Authorization from a position server in the mobile station is required for each and every request made by the mobile station, wherever positioned.

A location service necessitates the identification of the position of the mobile station. The position identification information is provided by a position server located in, or accessible by, the network in whose coverage area that the mobile station is positioned. The need always first to signal the position server of the home network of the mobile station when the position identification information is provided by the position server associated with the serving network, i.e., the network in whose coverage area that the mobile station is positioned is time-consuming, signaling-intensive, and complex.

If a manner could be provided by which to obviate the need of the mobile station to signal its home network each time in which the mobile station requests a location service, improved communication performance would be possible.

It is in light of this background information related to location services in a radio communication system that the significant improvements of the present invention have evolved.

SUMMARY OF THE INVENTION

The present invention, accordingly, advantageously provides apparatus, and an associated method, by which to perform a location service in which the position of a mobile station is identified.

Through operation of an embodiment of the present invention, a mobile station is provided with position identification information when the mobile station is positioned away from its home network, in a serving network.

In one aspect of the present invention, signaling is performed between the mobile station and a serving network position server pursuant to a location service without resort to signaling with a position server associated with the home network of the mobile station. Because the signaling is performed directly with the serving network position server, the delays and complexity associated with the need conventionally first to perform signaling with the home network of the mobile station is obviated. Improved communication performance is provided.

In another aspect of the present invention, the mobile station includes a cache memory element at which values representative of an address of the serving network position server of the serving network in whose coverage area that the mobile station is positioned is stored. The address of the position server is network dependent. That is to say, the address stored at the cache is of a value that identifies the address of the serving network in whose coverage area that the mobile station is presently positioned. When the mobile station moves into a coverage area encompassed by another serving network, the address stored at the cache is caused to be changed so that the current serving network position server remains identified at the cache.

The address stored at the cache is, for instance, provided thereto by an external source, for example, by the delivery of a dedicated message to the mobile station, originated by an entity of the serving network. For instance, a push message originated at any of: PDSN (Packet Data Service Node), WAP (Wireless Access Protocol) proxy, or other entity of the serving network provides the mobile station with the address of the serving network position server.

The dedicated, or other, message sent to the mobile station to inform the mobile station of the address of the serving network position server is sent responsive, e.g., to a trigger. The trigger is provided to the serving position server by the home network associated with the mobile station. That is to say, the mobile station informs the home network of its current location, such as pursuant to registration. And, in response, a trigger is forwarded to a home position server of the home network of the mobile station. The trigger is subsequently routed to the serving network position server. The trigger that is provided to the serving network position server contains the identity of the mobile station, e.g., in terms of its globally unique identity as well as, also, the IP address of the mobile station at the current position of the mobile station. Once this information is provided to the serving network position server, the IP address of the serving network position server is pushed to the mobile station. In an exemplary implementation, the message pushed to the mobile station is originated at the home network position server together with a session key to be used by the mobile station in subsequent location messages sent by the mobile station when the mobile station remains in the domain of the serving network position server. The push message forms any of: an IP-formatted message, a WAP push message, an SMS message, or other appropriately-formatted message that is delivered to the mobile station to inform the mobile station of the address of the serving network position server.

In another aspect of the present invention, the serving network position server maintains a copy of authentication and profile information associated with the mobile station, obtained from the home network. By maintaining this information, the serving network position server is able to authenticate location requests generated by the mobile station pursuant to performance of location services.

A network-initiated location service is also permitted. That is to say, the network part of a communication system is able to request that a mobile station make a location request. While, conventionally, the request is required to be directed first to the home network position server of the home network of the mobile station, maintenance of the address of the serving network position server at the mobile station permits the mobile station to contact the serving network position server directly, all without additional signaling to the home network position server. The cache is populated with a null value, the address of the home network position service, or otherwise is of a value causing the mobile station to signal the home network position server when the mobile station is positioned at the home network of the mobile station.

In a further aspect of the present invention, the home network position server maintains a state indication that identifies whether authentication and privacy information has been forwarded to the serving network position server. By maintaining the state indication at the home network position server, retransmission of the same information is avoided through appropriate check of the status of the state prior to transmission of the information.

In a yet further aspect of the present invention, the serving network position server sends billing information to the home network position server. A message containing this information is sent, for instance, after each mobile station-initiated or network-initiated location based service. Alternatively, consolidated billing information is formed and sent in a single message, such as subsequent to a selected number of location services or periodically.

Thereby, improved communication performance results as the home network need not be accessed prior to each location service, initiated by either the mobile station or by the serving network.

In these and other aspects, therefore, apparatus, and an associated method, is provided for facilitating position identification of a mobile station when roaming into a serving network having a serving network position entity. The mobile station is associated with a home network. An address identifier is configured to maintain a serving network position entity address of the serving network entity. A location identification request generator is adapted to receive an indication of the serving network position entity address maintained at the address identifier. The location identification request generator is configured to generate a location identification request when the mobile station is positioned at the serving network. The location identification request routed to the serving network position entity is identified by the serving network to position entity address without inquiry to the home network of the mobile station.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
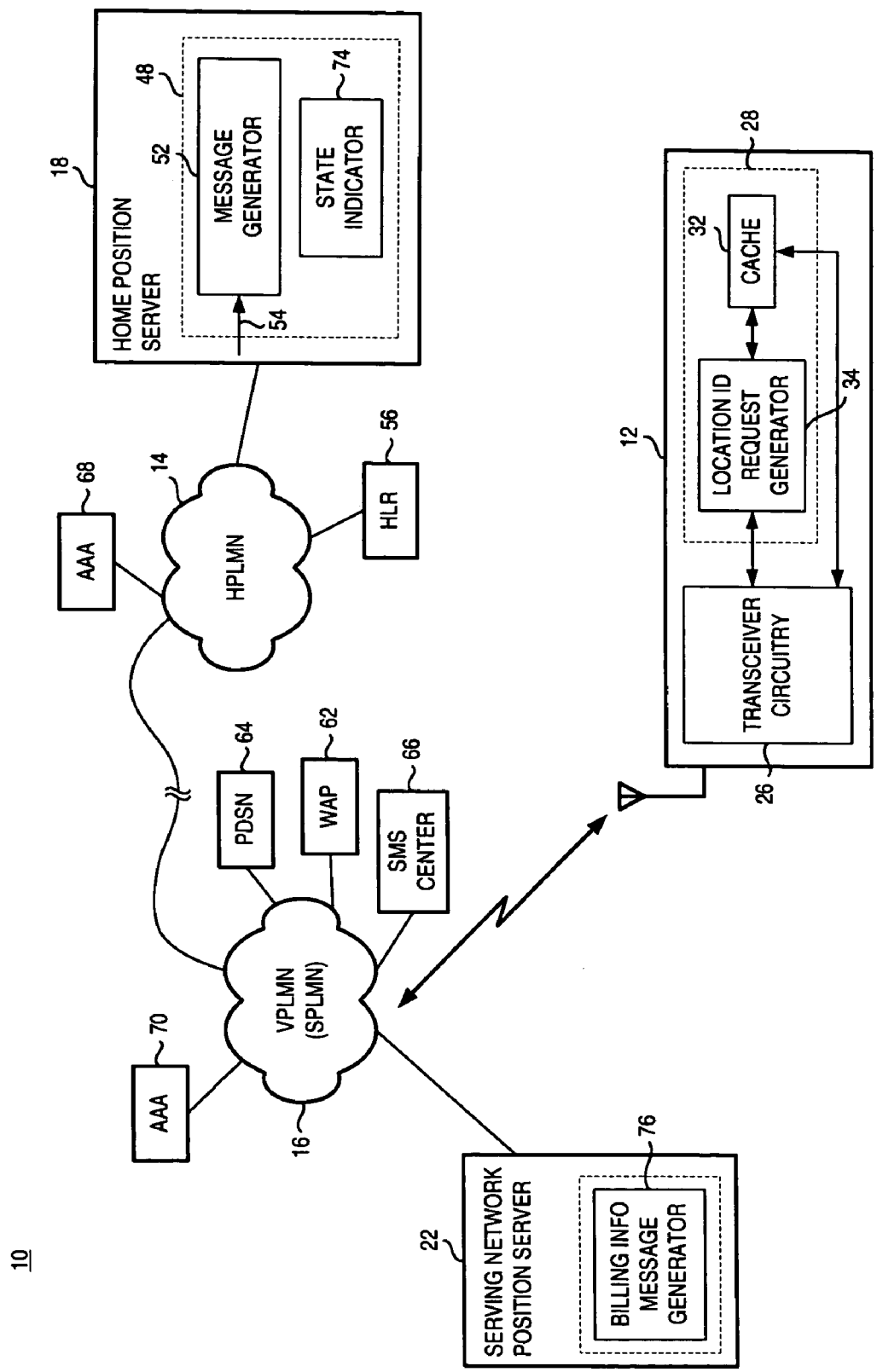
FIG. 1 illustrates a functional block diagram of a radio communication system in which an embodiment of the present invention is operable.

Referring first to FIG. 1, a radio communication system, shown generally at 10, provides for radio communications between a network and mobile stations of which the mobile station 12 is representative. In an exemplary implementation, the radio communication system operates pursuant to the operating parameters and protocols of a new-generation packet communication operating specification, such as that proposed by the Open Mobile Alliance (OMA) or the Third Generation Partnership Project 2 (3GPP2).

While the following description shall describe exemplary operation of the communication system 10 in which the radio communication system operates in general conformity with one of these operating standards, it should be understood at the outset that the teachings of the present invention are analogously implementable in other types of radio communication systems. The following description of exemplary operation of various embodiments of the present invention is, accordingly, merely exemplary. The teachings of the present invention are analogously implementable in such other systems.

The network part of the communication system includes portions forming Public Land Mobile Networks (PLMNs). The public land mobile networks are defined here in terms of the mobile station 12. That is to say, a network has the principal authoritative control of the mobile station's capability to communicate within its domain as well as other networks, and is referred to as its home network. Here, the network 14 forms the home network of the mobile station 12 and is identified as the Home Public Land Mobile Network (HPLMN) of the mobile station. When the mobile station is positioned within the coverage area of its home network, the mobile station generally communicates with, and by way of, its home network. However, the mobile station can roam beyond the coverage area of its home network into the coverage area of a visited, or serving, network. When the mobile station moves beyond its home network, the mobile station communicates by way of a serving, or visited, network, here the Visited Public Land Mobile Network (VPLMN) 16.

In conventional manner, the Home and Visited Public Land Mobile Networks 14 and 16 are interconnected to provide communication connectivity between the Public Land Mobile Networks. The Public Land Mobile Networks further include functional and physical entities of conventional nature operational in conformity with the general operating parameters of the appropriate standard promulgation of the operating specification pursuant to which the networks are operable.

As mentioned previously, IP-based location services are required to be available in the new-generation communication systems. And, position servers, or their functional equivalents, are embodied at, or associated with, the individual Public Land Mobile Networks to provide the location services. Here, position servers 18 and 22 are associated with the respective networks 14 and 16, respectively. The position server 18 forms a home position server with respect to the mobile station 12. And, the position server 22 forms a serving network, i.e., visited-network, position server. Conventionally, even when the mobile station roams beyond its home network, the mobile station must access its home network pursuant to each location service request for the effectuation of the location service. Such a requirement is signaling-intensive and time-consumptive. Pursuant to an embodiment of the present invention, a manner is provided that obviates the need of the access to the home position server for the effectuation of each location service during roaming operation of the mobile station beyond its home network.

The mobile station 12 includes transceiver circuitry 26 that operates to communicate with the network part of the communication system. Additionally, the mobile station includes apparatus 28 of an embodiment of the present invention. The apparatus 28 is functionally represented, formed of functional entities. The functional entities of which the apparatus is formed are implementable in any desired manner, including, for instance, algorithms executable by processing circuitry.

The apparatus 28 facilitates the effectuation of a location service, particularly when the mobile station roams beyond its home network. The apparatus includes a storage element forming a cache 32 and a location identification request generator 34. When a location service is to be effectuated, values stored at the cache 32 are accessed by the request generator and a message is generated by the location identification request generator for communication to the serving network position server to request the location service. By storing the address of the serving network position server at the cache 32, when a location service is to be requested by the mobile station when the mobile station is roaming in the visited network, request is made directly with the serving network position server free of signaling first with the home position server as conventionally required.

The value stored at the cache, in one implementation, is pre-configured, and is permanently, or semi-permanently, stored at the cache. In another implementation, the value stored at the cache can be updated by way of explicit messaging delivered from the home network 14 to the mobile station. Generally, the need to alter the contents of the cache would be very infrequent, e.g., when the address of the serving network position server is changed or when additional serving network position servers are added, such as through addition of serving network Public Land Mobile Networks through which the mobile station is permitted to communicate. In one implementation, the cache is populated with a pre-configured value that is retrieved from a list of IP addresses, or other address identifiers, that identify position servers of a list of visited networks in which the selection of which value to retrieve from the listing and to store in the cache is dependent upon and whose coverage area, i.e., which PLMN that the mobile station is positioned. That is to say, the value of the identifier contained in the cache changes whenever the mobile station moves out of the coverage area of a first serving network into another serving network. By knowing the address of the serving network position server, the message generated by the location identification request generator is addressed directly to the position server of the serving network in which the mobile station is positioned. Routing elsewhere, e.g., back to the home position server of the home network of the mobile station, is obviated.

When the mobile station is positioned in its home network, location services are effectuated through operation of the home position server 18. In one implementation, the value stored at the cache, when the mobile station is in its home network, is populated with a null value. In another implementation, the IP, or other, address of the home position server is stored in the cache and the message generated by the location identification request generator is routed to the home position server using the address retrieved from the cache. In the implementation in which a null value is populated in the cache when the mobile station is positioned within its home network, the IP address of the position server is otherwise known to the mobile station and used to address a request that is sent to the home position server.

The home network also includes apparatus, here shown generally at 48, of an embodiment of the present invention. The apparatus 48, in the exemplary implementation, is positioned at the home position server 18. In other implementations, the functions performed by the apparatus 48 are positioned elsewhere, or distributed across more than one location. The apparatus 48 is also functionally represented, implementable in any desired manner, such as, for instance, algorithms executable by processing circuitry.

The apparatus 48 operates to generate a message that identifies the IP, or other identification, address of the serving position server of the serving network 16 in whose coverage area that the mobile station is positioned. The message generation functionality provided by the apparatus 48 is here shown to be performed by a message generator 52. The message generated by the message generator 52 is generated responsive to a trigger, here indicated by the line 54, provided to the signal generator. The trigger is originated, for instance, responsive to registration of the mobile station at the home location register (HLR) 56. When the mobile station registers itself with the home location register, the mobile station is known to be positioned within the coverage area of the serving network 16. And, the registration of the mobile station at the serving network causes the trigger 54 to be generated to cause, in turn, generation by the message generator 52 of a message that includes the address of the serving network position server of the serving network in which the mobile station is registered to be positioned. In the exemplary implementation, the message generated by the message generator is routed through the home network 14 and the serving network 16 and delivered to an entity, such as a WAP (Wireless Access Protocol) proxy 62, a PDSN (Packet Data Service Node) 64, or SMS center 66, or another entity of the serving network that is capable of generating a push message for pushing a message including the IP address, or other identifying address of the serving network position server to the mobile station.

For instance, when the mobile station 12 is capable of receiving data calls, an IP message is deliverable to the mobile station; the information is pushed using, e.g., an IP-based message. The IP message is, in one implementation, a dedicated message. Alternately, the information is added or piggybacked onto another existing IP message originated at the home position server 18.

If the mobile station 12 is unable to receive a data call, such as when the mobile station is in a dormant mode, the information is pushed to the mobile station using a WAP push mechanism provided by the WAP proxy. A WAP push mechanism has several functionalities that permit information to be pushed from a serving position server even if the mobile station supports data connections. In another implementation, an SMS message is used as the bearer of the information.

In one implementation, the message that is generated by the message generator also includes, or is sent together with, a session key that is to be used by the mobile station when communicating subsequent location messages while the mobile station remains in the area encompassed by the serving network.

The apparatus 48 also operates pursuant to an embodiment of the present invention to provide the serving position server with privacy profile and authentication credentials associated with the mobile station. The message generator 52 of the apparatus 48, in this implementation, further generates a dedicated message that is communicated by the home position server to the serving network position server that includes the privacy profile and authentication credentials of the mobile station. Alternately, the message generated by the message generator is communicated using existing messages associated with the security infrastructure that is conventionally available in the networks.

In one implementation, the home position server instructs the AAA infrastructure 68 in order to push the information to the corresponding AAA infrastructure 70 of the serving network. The AAA infrastructure of the serving network, in turn, forwards the information onto the mobile station. In this implementation, if the information is not forwarded to the serving position server by the mobile station, the serving position server makes a local query to its AAA infrastructure, i.e., the infrastructure of the serving network, to authenticate location requests generated subsequently by the mobile station. The AAA infrastructure here refers to any security infrastructure, comprising one or many entities, that is used to provide authentication, authorization, accounting, and privacy functionalities. When the mobile station exits the serving network, the information is deleted from the serving network location at which it is stored.

Pursuant to operation of an embodiment of the present invention, a network-initiated location communication service request is also provided. In the event that the serving position server information has not already been pushed to the mobile station, the serving position server information, together with appropriate session keys, are sent to initiate the location request. Additionally, authentication and privacy information is also pushed to the serving position server/entity in the serving position server's by the message generator 52.

The apparatus 48 further includes a state indicator 74. The state indicator 74 is populated with a value that indicates whether a message has been generated by the message generator 52 containing the authentication/privacy information and forwarded to the serving network and pushed to the mobile station. For appropriate access of the value of the state indication, unnecessary retransmission of the message need not occur, such as a result of temporary disconnection of the mobile station.

Pushing of billing information by the serving position server to the home position server is also provided. Once the location based messaging finishes pursuant to a location service, the serving position server sends associated billing information to the home position server, here by a billing message generator 76 embodied at the server 22. This message is sent, for instance, after each mobile station initiated or network initiated location based service. Alternately, consolidated billing information is provided subsequent to several location based service requests. Or, the billing information is sent when the mobile station moves out of the domain or coverage area encompassed by the serving network. By way of this operation, decoupling of billing events from an actual location process is provided.

Figure 2:
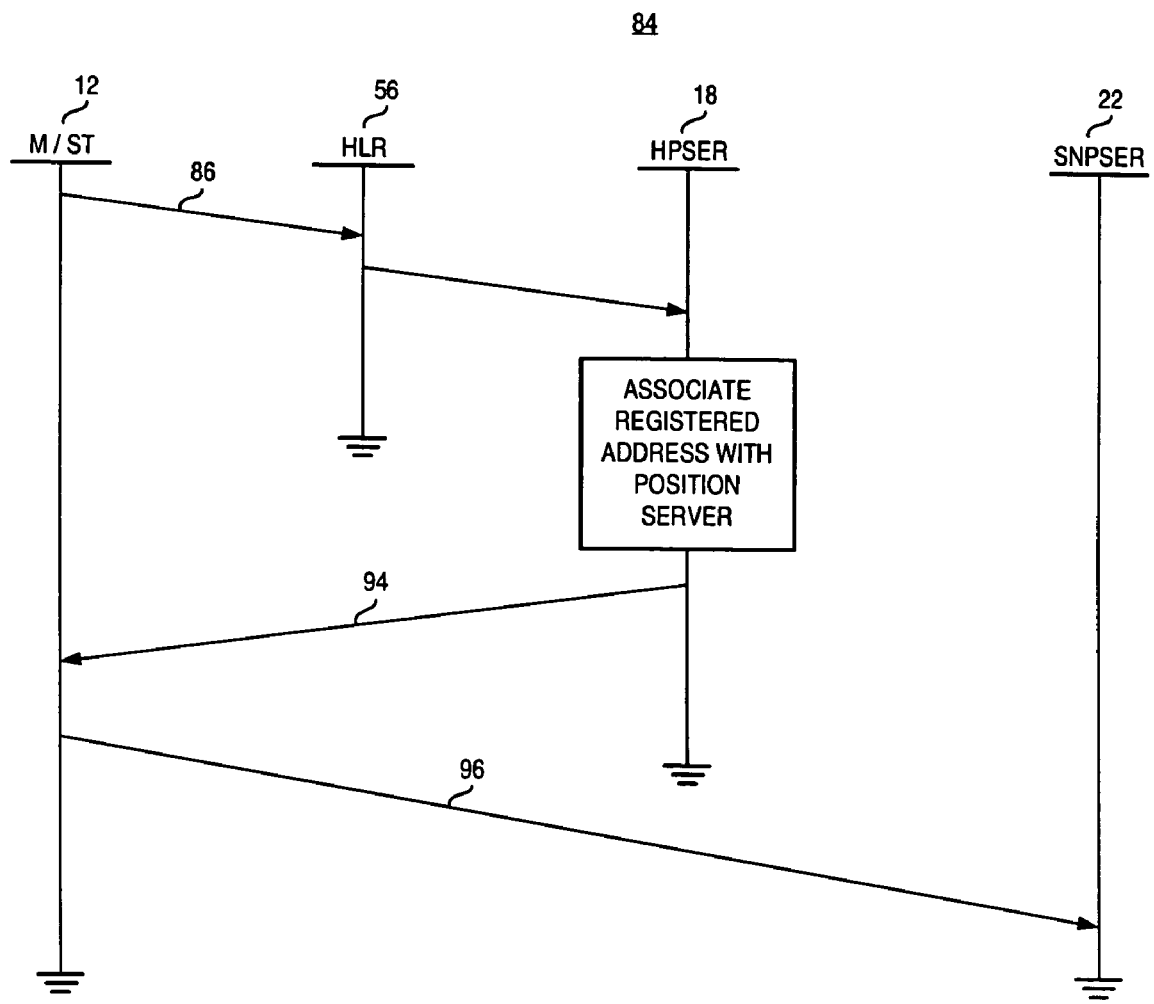
FIG. 2 illustrates a message sequence diagram representative of signaling generated during operation of the radio communication system shown in FIG. 1 pursuant to operation of an embodiment of the present invention.

FIG. 2 illustrates a message sequence diagram, shown generally at 84, representative of signaling generated pursuant to operation of the communication system 10 shown in FIG. 1. The messaging is representative of a manner by which the cache 32 of the mobile station 12 is populated with a value identifying the IP, or other, address of the serving network position server.

First, and as indicated by the segment 86, the mobile station sends a message to the home location register 56 to register the mobile station, here to identify that the mobile station is located in the coverage area of the public land mobile network 16. The HLR, in turn, forwards, indicated by the segment 88, the registration information onto the home position server 18. The home position server associates the registration information provided by the HLR with an IP address of the position server of the network identified in the registration information, as indicated by the block 92. And, the home position server generates a message, indicated by the segment 94, for forwarding on to the mobile station to be stored at the cache 32 thereof.

Thereafter, when a location service is to be effectuated, the mobile station communicates directly, indicated by the segment 96, with the serving network position server 22.

Figure 3:
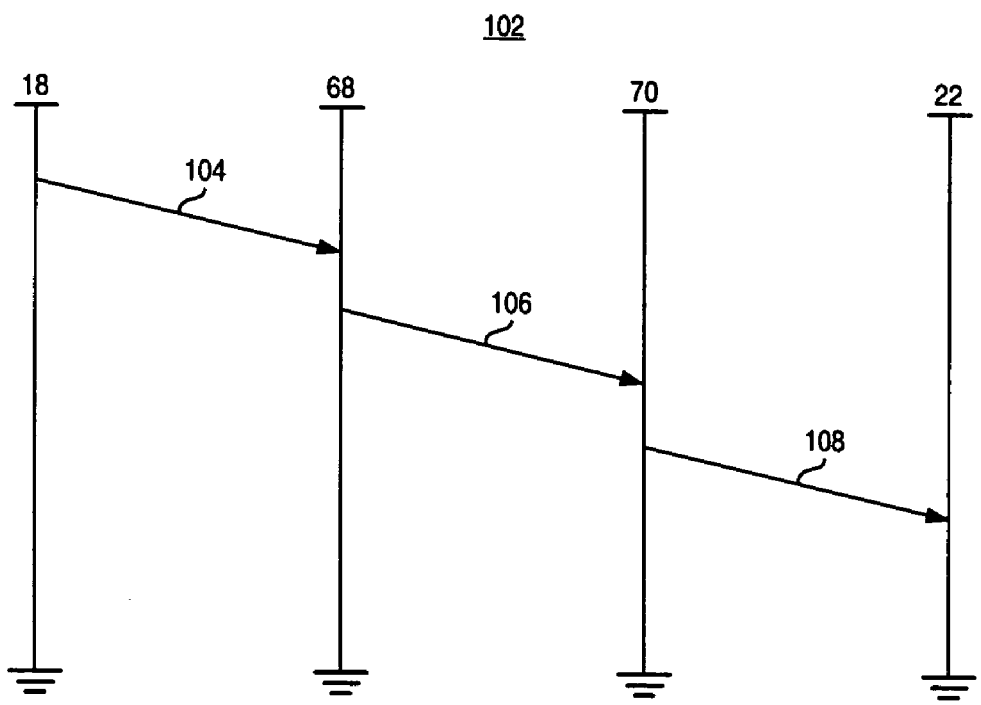
FIG. 3 illustrates a message sequence diagram representative of signaling generated during operation of the radio communication system shown in FIG. 1 pursuant to a further embodiment of the present invention.

FIG. 3 illustrates a message sequence diagram, shown generally at 102, also representative of signaling generated during operation of the communication system 10, shown in FIG. 1, pursuant to an embodiment of the present invention. Here, signaling generated by way of which to provide the serving position server with privacy profile and authentication credentials of the mobile station is shown. First, and as indicated by the segment 104, the home position server causes the home-network AAA infrastructure 60 to push information related to the mobile station's privacy profile and authentication credentials to corresponding AAA infrastructure 70 of the serving network. The home-network AAA infrastructure forwards the information, indicated by the segment 106, to the serving network AAA infrastructure. The information, in turn, is provided, indicated by the segment 108, to the serving network position server 22. The information is subsequently used pursuant to location service requests made by the mobile station.

Figure 4:
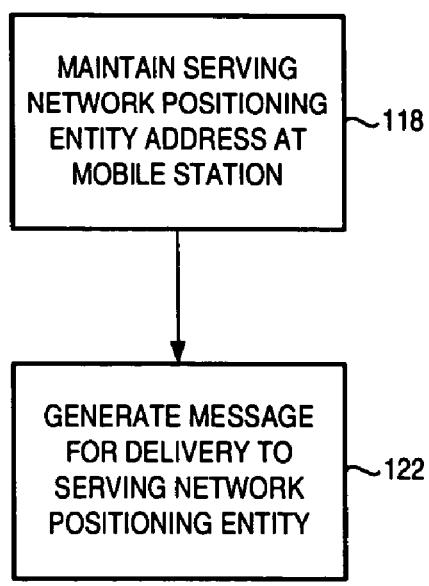
FIG. 4 illustrates a method flow diagram illustrating the method of operation of an embodiment of the present invention.

FIG. 4 illustrates a method flow diagram, shown generally at 116, representative of the method of operation of an embodiment of the present invention. The method 116 facilitates position identification of a mobile station that roams into a serving network. The mobile station is associated with the home network. First, and as indicated by the block 118, a serving network positioning entity address of the serving network entity is maintained at the mobile station.

Then, and as indicated by the block 122, a message is generated. The message is for delivery to the serving network position entity. The message identifies authentication indicia that is associated with the mobile station and required by the serving network position entity to provide position identification information to the mobile station.

Thereby, through operation of an embodiment of the present invention, a manner is provided by which to permit a mobile station roaming beyond its home network to contact a serving network position server directly pursuant to effectuation of a location service. Delays in signaling overhead associated with a conventional requirement always to communicate first by way of a home position server is obviated.

The previous descriptions are of preferred examples for implementing the invention, and the scope of the invention should not necessarily be limited by this description. The scope of the present invention is defined by the following claims.

What is claimed is:

1. An apparatus comprising processing circuitry configured to control:
an address identifier configured to maintain a serving network position entity address of a serving network position entity of a serving network by storing the address of the serving network position entity at a mobile station; and
a location identification request generator configured to receive an indication of the serving network position entity address maintained at said address identifier, said location identification request generator configured to generate a location identification request when a mobile station employing the apparatus is positioned at the serving network, the location identification request routed to the serving network position entity identified by the serving network position entity address without inquiry to a home network of the mobile station in response to a location service being requested by sending the location identification request to the address stored at the mobile station,
wherein the serving network position entity address stored is a pre-configured value to enable interaction directly between the mobile station and the serving network for location services without inquiry to the home network.

2. The apparatus of claim 1 wherein said address identifier comprises a cache embodied at the mobile station, the cache for caching the serving network position entity address of the serving network position entity of the serving network in which the mobile station is positioned.

3. The apparatus of claim 2 wherein the serving network position entity address cached at the cache is updatable, dependent upon the serving network in whose coverage area that the mobile station is positioned.

4. The apparatus of claim 1 wherein the serving network position entity address maintained at said address identifier is provided thereto by delivery of a message pushed to the mobile station.

5. The apparatus of claim 4 wherein the message that provides the mobile station with the serving network position entity address is originated at the home network associated with the mobile station.

6. The apparatus of claim 4 wherein the message that provides the mobile station with the serving network position entity address comprises an Internet Protocol-formatted message.

7. The apparatus of claim 4 wherein the message that provides the mobile station with the serving network position entity address comprises a Wireless Access Protocol (WAP) message.

8. The apparatus of claim 4 wherein the message that provides the mobile station with the serving network position entity address comprises an SMS message.

9. The apparatus of claim 1 wherein the location identification request generated by said location identification request generator is generated responsive to instruction delivered to the mobile station.

10. The apparatus of claim 1 wherein the location identification request generated by said location identification request generator is mobile station initiated.

11. An apparatus comprising processing circuitry configured to control:
a home-network message generator positioned at a home network associated with a mobile station, said home-network message generator configured to generate a message for delivery to a serving network position entity of a serving network when the mobile station enters the serving network, the message identifying authentication indicia associated with the mobile station required by the serving network position entity, the home-network message generator being further configured to provide the mobile station with a serving network position entity address to be stored at the mobile station to enable the provision of position identification information to the mobile station without inquiry to the home network in response to a location service being requested,
wherein the serving network position entity address stored is a pre-configured value to enable interaction directly between the mobile station and the serving network for location services without inquiry to the home network.

12. The apparatus of claim 11 wherein the message generated by said home-network message generator comprises a dedicated message.

13. The apparatus of claim 11 wherein the message generated by said home-network message generator forms part of a security infrastructure.

14. The apparatus of claim 11 wherein the message generated by said home-network message generator comprises a push message, pushed by said home-network message generator to the serving network position entity.

15. The apparatus of claim 11 further comprising a state identifier adapted to receive an indication of communication of the message generated by said home-network message generator, said state identifier configured to identify whether the message has been sent to the serving network position entity.

16. A method comprising:

maintaining a serving network position entity address of a serving network entity at a mobile station by storing the serving network position entity address at the mobile station; and generating a message for delivery to the serving network position entity using the serving network position entity address stored at the mobile station, the message identifying a location service requested by the mobile station, the location service to be provided by the serving network position entity in relation to provision of position identification information to the mobile station without inquiry to the home network in response to a location service being requested, wherein the serving network position entity address stored is a pre-configured value to enable the mobile station to interact directly with the serving network entity for location services without inquiry to the home network.

17. The method of claim 16 further comprising the operations of detecting delivery at the mobile station of identification, provided by the home network, of the address of the serving network entity.

18. The method of claim 16 wherein said operation of maintaining comprises updating the serving network address.

19. The method of claim 16 further comprising the operation of detecting delivery at the mobile station of an instruction that instructs the mobile station to send the message.

20. The method of claim 19 wherein said operation of generating is performed responsive to the instruction detected during said operation of detecting.

21. The apparatus of claim 11 wherein the message identifying authentication indicia is stored on the serving network position entity and deleted from the serving network position entity when the mobile station exits the serving network.

* * * * *